Dec. 6, 1966 L. M. VALLESE ETAL 3,290,504

DISTORTION COMPENSATION OF OPTOELECTRONIC DEVICES 307/196

Filed Sept. 6, 1963 3 Sheets-Sheet 1

INVENTORS.
LUCIO M. VALLESE
MARVIN KING
BY Edward Goldberg
ATTORNEY

INVENTORS.
LUCIO M. VALLESE
MARVIN KING
BY Edward Goldberg
ATTORNEY

Dec. 6, 1966 L. M. VALLESE ETAL 3,290,504

DISTORTION COMPENSATION OF OPTOELECTRONIC DEVICES

Filed Sept. 6, 1963

3 Sheets-Sheet 3

INVENTORS.
LUCIO M. VALLESE
BY MARVIN KING
Edward Goldberg
ATTORNEY

United States Patent Office 3,290,504

Patented Dec. 6, 1966

3,290,504

DISTORTION COMPENSATION OF OPTO-ELECTRONIC DEVICES

Lucio M. Vallese, Glen Ridge, N.J., and Marvin King, New York, N.Y., assignors to International Telephone and Telegraph Corporation, Nutley, N.J., a corporation of Maryland Filed Sept. 6, 1963, Ser. No. 307,196
8 Claims. (Cl. 250—199)

This invention relates to a circuit arrangement for compensating for output distortion occurring in the modulation of optoelectronic devices and particularly for elimination of undesirable harmonics.

In the past, distortion in the output of conventional electronic amplifiers has been reduced by use of push-pull arragements of identical units wherein the input elements are driven with signals of equal magnitude but of opposite phase, with outputs being connected in a difference mode. In a well known manner, the even harmonics in the output are balanced out while the odd harmonics, which are progressively of lesser amplitudes, add. The amplifiers can thus be driven harder for a prescribed maximum percentage distortion.

Similar distortion problems have also been encountered in more recently developed optoelectronic laser devices, including various solid and gaseous optical oscillators and semiconductor devices such as gallium arsenide diodes. The latter are capable of radiation emission and also of laser action under specified forward bias excitation. Output modulation distortions are generally produced by inherent nonlinear input characteristics, while in addition, distortion in semiconductors is caused by the complex mechanism of electron-hole recombination or photon emission effects. A more detailed explanation of the theory of these complex actions may be found in an article by R. N. Hall, entitled "Recombination Processes in Semiconductors," Proceedings of British I.E.E., Part B, vol. 106, page 929, 1959. The semiconductor radiation emitters may be modulated rather simply by direct modulation of the injected current and have large bandwidth capabilities. They are thus very useful as communication links which can carry large numbers of channels. However, the performance of these devices, has been limited by distortion and no satisfactory method of compensation of this effect has been achieved.

It is therefore the primary object of the present invention to provide a simple practical arrangement for compensation of second harmonic distortion in the modulation of optoelectronic devices. This may be accomplished by a novel technique wherein the inputs of two such devices are driven in a particular phase relationship, with resultant radiations polarized in the same direction being superimposed or added in a common path or output device. In a preferred embodiment, a phase splitter or shifter provides input signal currents through the devices in a 90° phase relation, with the parallel light outputs being directed onto a common path by use of mirrors. The resulting reduction of harmonics permits use of a larger dynamic range of modulation for a predescribed maximum percent distortion and greater operational efficiency. The details of the invention will be more fully understood and other objects and advantages will become apparent in the following description and accompanying drawings wherein:

Figures 1, 1A, 6, 6A:
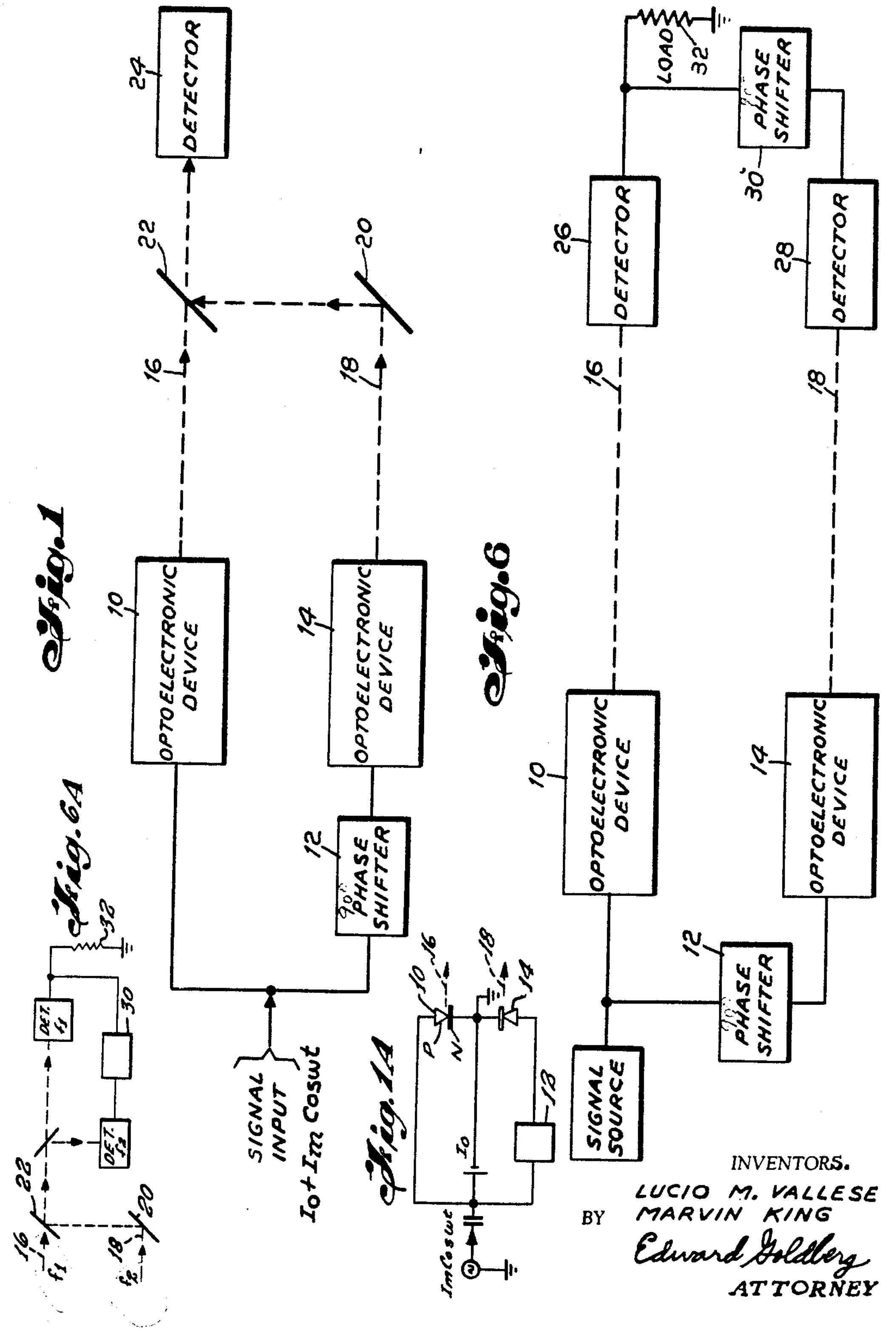
FIG. 1 shows a block diagram of a system incorporating the present novel arrangement.
FIG. 1A shows a schematic diagram including a pair of semiconductor diode optoelectronic devices which provide sources of light radiation.
FIG. 6 shows another variation of a distortion compensation system.
FIG. 6A shows a further variation for a system using two different frequencies.
Figure 2:
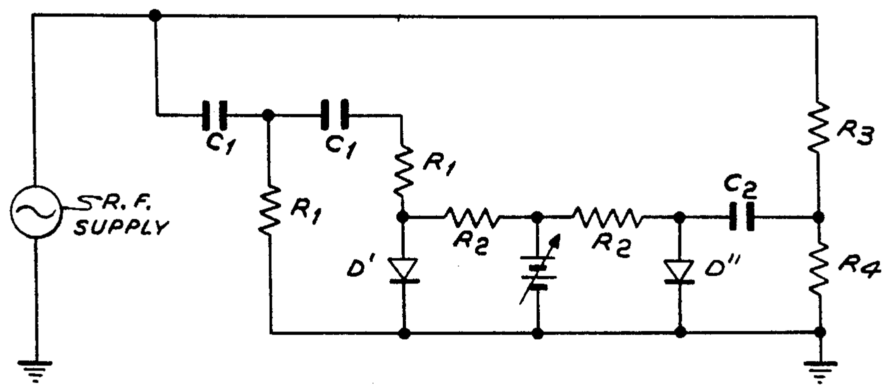
FIG. 2 shows further details of a schematic diagram of a semiconductor diode phase shift and bias network.

As shown in FIG. 1, an input current $I_1=I_o+I_m \cos \omega t$ is fed into a first optoelectronic device stage 10 and also into a 90° phase shift network 12. $I_o$ represents the D.C. component and $I_m$ is the maximum amplitude of the A.C. component, which currents are supplied by any suitable sources such as shown in FIG. 1A. Network 12 may be any suitable known phase shift circuit such as shown in FIGURE 2. Resultant current $I_2=I_o+I_m \cos (\omega t+\pi/2)$ in quadrature with the input reference current, is fed from network 12 into a second like optoelectronic device stage 14. The devices of stages 10 and 14 are preferably of gallium arsenide P-N junction diodes, as illustrated in FIG. 1A, or other suitable semiconductor materials which exhibit radiation emission properties upon proper excitation by injected currents. The resultant rate of photon emission, N, is assumed to have a quadratic relationship with respect to input current of the following type, $$N=a_1I+a_2I^2$$

Therefore, by substitution, $$N_1=a_1I_o+a_1I_m \cos \omega t+a_2I_o^2+2a_2I_oI_m \cos \omega t+\frac{a_2I_m^2}{2}+\frac{a_2I_m^2}{2} \cos 2\omega t$$

$$N_2=a_1I_o+a_1I_m \sin \omega t+a_2I_o^2+2a_2I_oI_m \sin \omega t+\frac{a_2I_m^2}{2}-\frac{a_2I_m^2}{2} \cos 2\omega t$$

The latter terms of each equation constitute the second harmonic components of the emitted radiation.

The radiation emission from the diodes of one particular frequency travels in separate paths 16, 18 with light from path 18 being reflected by mirror 20 into path 16, where the two are combined by semi-transparent mirror 22. Each of the mirrors is positioned at a 45° angle with respect to the light paths. The superimposed light outputs then pass through and are reflected respectively by mirror 22 in a common path to a suitable light detector 24, such as a photomultiplier tube. Assuming that, after combining, the beams maintain the same relative amplitudes of like harmonic components, the outputs are now added, with the resultant radiation being $$N_1+N_2=\sqrt{2}a_1I_m \sin\left(\omega t+\frac{\pi}{4}\right)+a_2I_m^2+2a_1I^0+2a_2I_o^2+2\sqrt{2}a_2I_oI_m \sin\left(\omega t+\frac{\pi}{4}\right)$$

Thus, it is seen that addition of the expressions results in cancellation of the noted second harmonic terms and compensation of the second harmonic distortion components is obtained. If the beams, after combining, do not present the same relative amplitudes of like harmonic components, suitable attenuation or polarization may be introduced to obtain this condition.

For a single device, the relative second harmonic distortion may be expressed as $$D=\frac{a_2I_m}{2(a_1+2a_oI_m)}$$

which reduces to zero for perfectly matched pairs. With the current amplitudes unbalanced but the constant terms identical, the distortion ratio of the combination is $$D_2=\frac{a_2\sqrt{2}\Delta I_m}{2(a_1+2a_oI_m)}=D\sqrt{2}\frac{\Delta I_m}{I_m}$$

with $D_2$ being proportional to relative current imbalance.

Figures 3, 5:
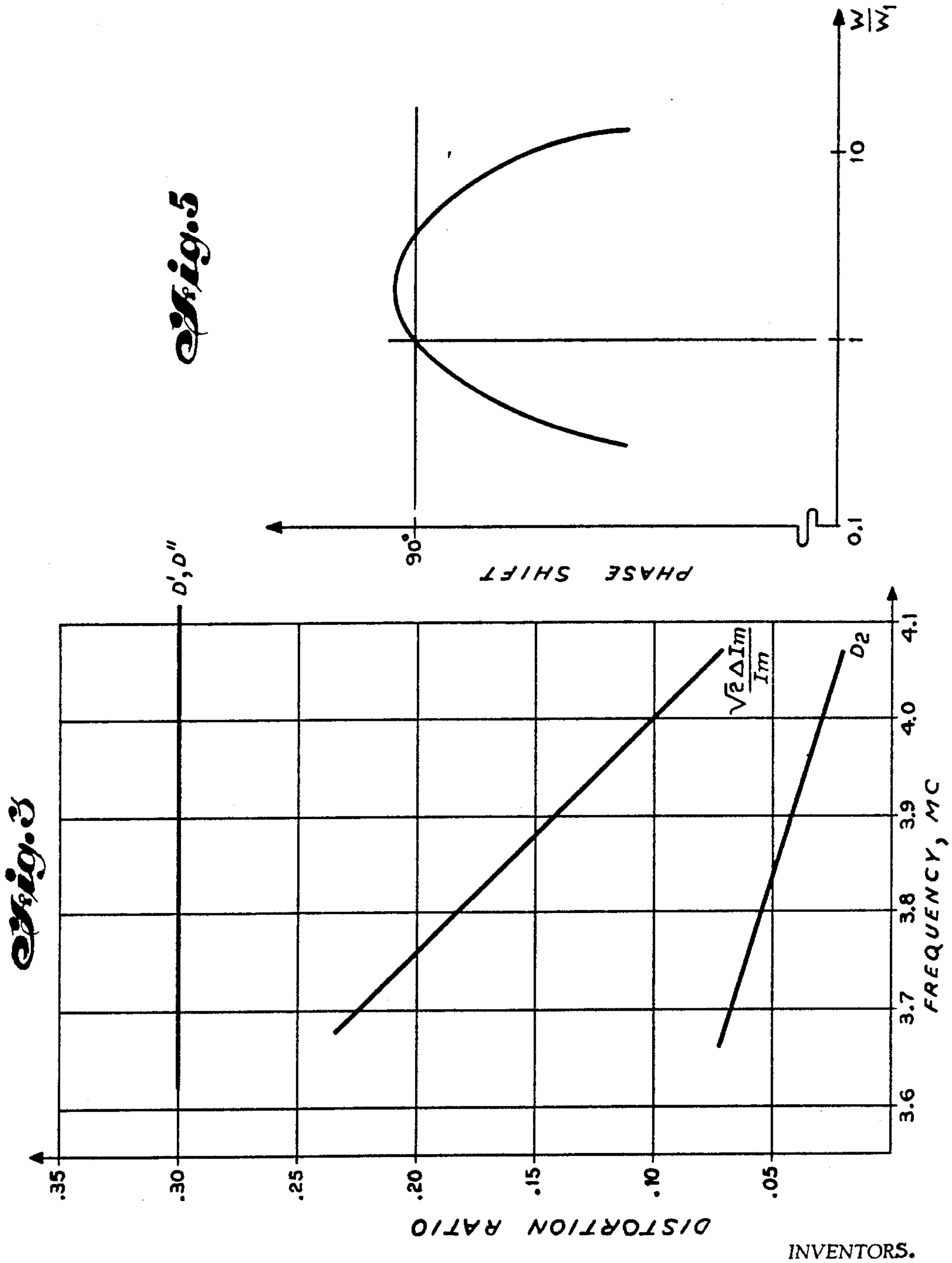
FIG. 3 shows response curves of the relative distortion, with and without the present device.
FIG. 5 shows the performance curve of the network of FIG. 4.

Measurements taken with modulation frequencies in the range of 3 to 4 mc., show the results of relative second harmonic distortions D′ and D″ of each diode, relative unbalance of the input currents $$\sqrt{2}\frac{\Delta I_m}{I_m}$$

and resultant distortion ratio $D_2$ of the combination, as plotted in FIGURE 3. It is seen that the resultant distortion is reduced from the original value of 30% to values of the order of 5%, or a reduction of more than 20 db.

FIG. 2 shows further circuit details of an arrangement such as in FIG. 1A including a 90° phase shift network of a simple two-section resistor-capacitor ladder type. For R and C of equal values the quadrature condition is realized at only one frequency in accordance with the relationship $\omega RC=1$. The network as used in plotting the curves of FIGURE 3, provides good response to frequencies slightly above and below the $1/RC$ frequency, wherein the phase shift differs from 90°.

Figure 4:
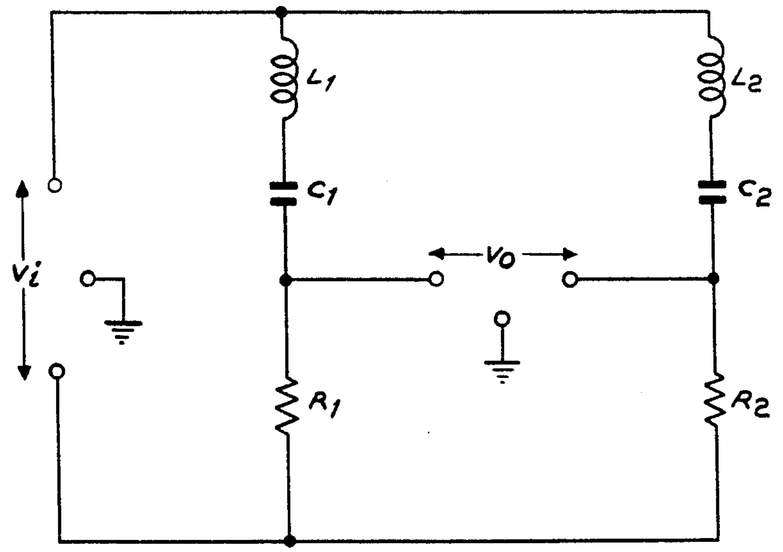
FIG. 4 shows another phase shifting or splitting network which may be used in conjunction with the circuit of FIG. 2 for extended frequency ranges.

Distortion compensation may be further extended to wide bands, by use of a 90° phase splitter or shifter with resonant branches which vary with frequency, as shown in FIGURE 4. The output voltages of the individual resonant branches vary correspondingly so that the net difference of the two phase angles is approximately constant over a wide frequency range. For example, if the Q factor of each branch is 0.3 and the two resonant frequencies are respectively $\omega_1=1/\sqrt{L_1C_1}$ and $\omega_2=1/\sqrt{L_2C_2}$ with $\omega_2$ approximately equal to $3.4\omega_1$, the output phase remains between 89° and 91° in the range of frequencies $0.8\omega_1$ to $4.0\omega_1$, as shown in the performance curve plotted in FIGURE 5.

Distortion compensation of optoelectronic devices may also be achieved by other similar techniques such as feeding signals in phase opposition to the inputs of two identical elements, and obtaining signals to proportional to the difference of the individual modulation components of the output radiation. However, in this case it is necessary to transmit two radiations over non-coincident space-time pats, either on different trajectories at the same carrier frequency, or on the same path at different carrier frequencies. The former arrangement is shown in FIGURE 6, wherein the two radiation transducers 10, 12 are excited 180° out of phase and light in parallel paths 16, 18 is detected by separate phototubes 26, 28. Outputs are thereafter properly oriented by use of a second phase shifter 30 and combined in a common load 32, wherein the distortion compensation occurs. Where light is transmitted by two different frequencies $f_1$, $f_2$ the paths may be combined, as shown in FIG. 6A, and separation is obtained by any known suitable device such as a mirror-filter having a dielectric coating which transmits one frequency and reflects the other toward two detectors sensitive to each different frequency. Where the same frequencies are used, $f_1=f_2$, the paths are maintained separately and identical detectors are employed. In both these cases, distortion compensation is obtained after detection, rather than before, as in the first configuration.

It may thus be seen that the present invention provides a novel simple arrangement for reduction of distortion of optoelectronic devices, which may also be extended in frequency range. While several embodiments have been illustrated, the invention is not to be considered as limited to the exact form or use shown and many other variations may be made in the particular configuration without departing from the scope of the invention as set forth in the appended claims.

What is claimed is:

1. A distortion compensation circuit comprising:

a pair of like optoelectronic devices providing light radiation emission upon application of electrical energy excitation under predetermined conditions;

common input means for applying a varying electrical signal to each of said devices to modulate said light radiation emission;

phase shifting means connected between one said device and said input means to apply said signal to said one device in a predetermined phase relation with respect to the other device, said devices being positioned to emit light radiations in separate spaced paths; and means responsive to said light radiations for combining energy from said paths in a predetermined phase relation to provide a common output electrical signal wherein modulation nonlinearities of each said device are balanced out.

2. The device of claim 1 wherein said phase shifting means comprises:

a quadrature phase splitter, said light radiations being of the same frequency and in parallel paths, and including;

a radiation reflecting mirror positioned in one path to direct radiation toward the other path; and a semi-transparent mirror in the other path to reflect and transmit radiation from respective said paths to combine said energy in a common path.

3. The device of claim 1 wherein said devices comprise a pair of semiconductor P-N junction diodes, and said input means comprises a source of current having direct and alternating components.

4. The device of claim 1 wherein said phase shifting means provides a signal to said one device in phase opposition with respect to said other device, and including separate light radiation sensitive means responsive to light radiations from said respective devices and connected to a common load means.

5. The device of claim 2 including light radiation sensitive means positioned in said common path to provide a modulated output signal of reduced second harmonic distortion.

6. The device of claim 4 including a second phase shifting means providing a signal from one of said radiation sensitive means to said load in phase opposition with respect to the other.

7. The device of claim 6 wherein said radiations are of the same frequency and in parallel paths and said radiation sensitive means are positioned in each respective path.

8. The device of claim 6 wherein said radiations are of different frequencies and including means for combining said radiations in a common path, each said radiation sensitive means being positioned to detect radiations from said common path and being responsive only to frequencies of one said device.

References Cited by the Examiner

UNITED STATES PATENTS

| | | | |
|---|---|---|---|
| 2,175,270 | 10/1939 | Koch | 325—65 X |
| 2,531,951 | 11/1950 | Shamos et al. | 250—199 |
| 2,745,316 | 5/1956 | Sziklai | 88—61 |
| 3,059,117 | 10/1962 | Boyle et al. | 250—199 X |
| 3,105,937 | 10/1963 | Brune et al. | 325—65 X |
| 3,215,840 | 11/1965 | Buhrer | 250—199 |

OTHER REFERENCES

Rediker et al.: Electronics, vol. 35, No. 10, Oct. 5, 1962, pp. 44, 45.

DAVID G. REDINBAUGH, *Primary Examiner.*

JOHN W. CALDWELL, *Examiner.*